Nov. 3, 1925.
J. C. HALE
1,559,693
ELECTRIC CONTROL SYSTEM
Filed Nov. 2, 1921
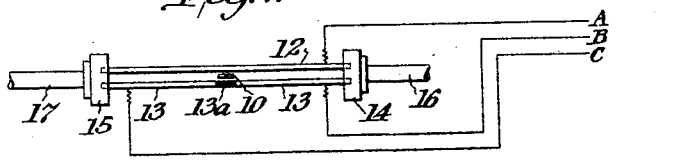
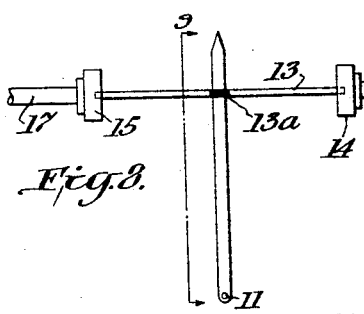
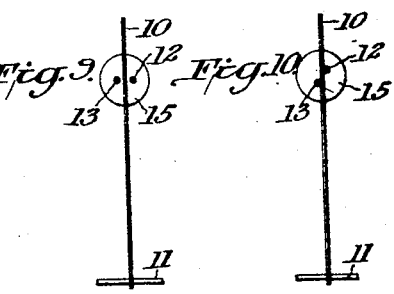
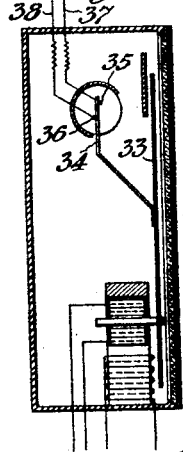
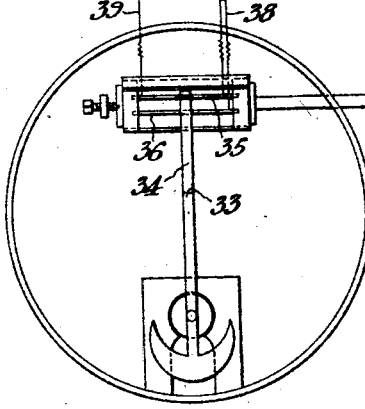
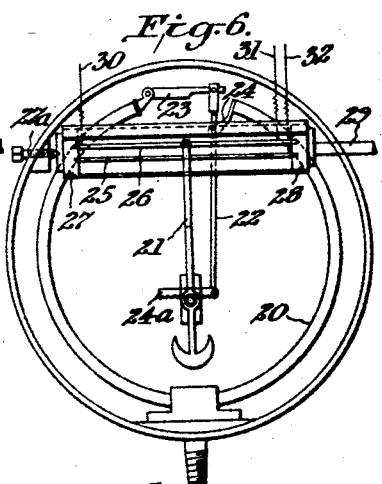
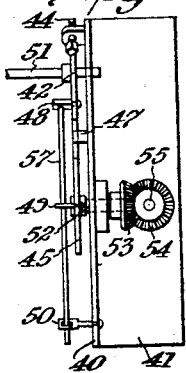
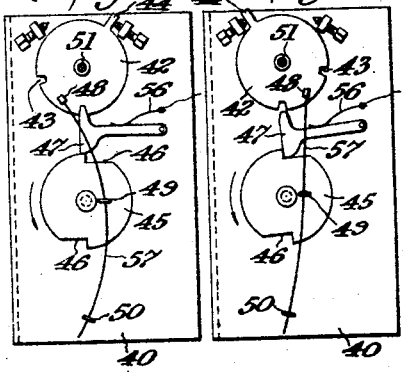
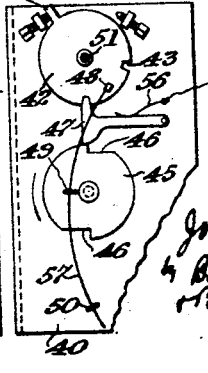
Inventor:
John C. Hale
by Byrnes Townsend
& Brickenstein
Attorneys Patented Nov. 3, 1925.

1,559,693

UNITED STATES PATENT OFFICE.

JOHN C. HALE, OF TARRYTOWN, NEW YORK, ASSIGNOR TO RESEARCH CORPORATION, OF NEW YORK, N. Y.

ELECTRIC CONTROL SYSTEM.

Application filed November 2, 1921. Serial No. 512,368.

*To all whom it may concern:*

Be it known that I, JOHN C. HALE, a citizen of the United States, residing at Tarrytown, in the county of Westchester and State of New York, have invented certain new and useful Improvements in Electric Control Systems, of which the following is a specification.

This invention relates broadly to electric mechanism for producing varying effects corresponding to the variations of conditions as indicated by an indicating instrument and more particularly to means for controlling electric translating devices through the pointer of an indicating instrument.

It has been the practice to provide a plurality of contacts in close proximity to the plane of motion of the pointer and to deflect the pointer out of its normal plane of motion to establish electrical connection with such contacts forming in turn parts of electric circuits for controlling electric translating devices.

Such arrangements have the disadvantage that a strain is put on the usually delicate pivot bearing of the pointer and have a further disadvantage that the pointer must be made a part of the electric circuit.

In another form of device of generally similar character the needle strikes directly against stops placed a short distance on either side of the neutral position. The contact is made through the needle at either one or the other of the stops. This arrangement has the disadvantages of being liable to chatter and of making relatively poor contact. The latter disadvantage is particularly pronounced in instruments having a relatively small torque. Another disadvantage of this form is found in the fact that no provisions can be readily made for making and breaking the contact with a snap movement.

It is an object of this invention to provide mechanism of this character in which these disadvantages are avoided.

It is another object to provide an exceedingly simple mechanism for carrying out the functions for which instruments of this type are intended.

Other objects will appear from the specification and the accompanying drawings forming a part thereof and the invention will be particularly pointed out in the claims.

In the drawings

Fig. 1 is a vertical section through a galvanometer embodying the invention;

Fig. 2 is a front view of the instrument;

Fig. 2ª is a side elevation of auxiliary operating mechanism;

Figs. 3, 4 and 5 are front elevations of the auxiliary operating mechanism in different positions;

Fig. 6 is a front elevation of a pressure or vacuum gauge embodying the invention;

Fig. 7 is a fragmentary plan view on a larger scale of the detail forming the most essential part of the invention;

Fig. 8 is an elevation thereof;

Fig. 9 is a sectional view on line 9—9, Fig. 8;

Fig. 10 is a similar view showing the parts in a different position; and

Fig. 11 is a fragmentary view of a detail.

The essential part of the invention is best represented in Figs. 7–10 where 10 indicates the pointer of an indicating instrument such as are commonly used for indicating conditions at a source of energy. Most of such pointers are mounted for pivotal movement. For convenience therefore I have illustrated the invention as applied to a pointer having angular motion about a pivot 11.

On opposite sides of the pointer and substantially parallel to the plane of motion thereof are disposed rods or wires 12 and 13 mounted on supports 14 and 15 which are carried upon shafts 16 and 17 whose common axis lies substantially in the plane of movement of the pointer 10 and preferably at right angle to the normal or neutral position thereof.

The rod 12 has the characteristics of an electric conductor throughout its lengths while the rod 13 is composed of two conductors mechanically interconnected by a section 13ª of insulating material for electrically separating the two conductors. The three conductors are electrically connected to the lines A, B and C respectively.

In the position shown in Figs. 7, 8 and 9 the position of the rods 12 and 13 is such that the pointer is free to angularly move about its pivot to perform its function as an indicating instrument. When the shafts 16 and 17 or either one of them is moved about its axis, the rods 12 and 13 may be brought into contact with the pointer 10 as indicated in Fig. 10. In such position the pointer forms a bridge between the rods and electrically interconnects the rods except when the pointer is exactly in its neutral position where it would contact on one side with the insulating section 13ª whose length is slightly in excess of the width of the pointer 10.

When the pointer assumes a position to the left of this neutral position, electric connection is established between the line A and the line B. When the pointer is to the right of the neutral position, connection is made between the lines A and C. The lines A and B may constitute part of a circuit including one translating device and the lines A and C may constitute another circuit including another translating device. By means of these separate circuits it is possible to produce effects as a function of the position of the pointer relatively to the neutral or normal position.

It is not necessary for the purpose of explaining the invention proper, whether the translating devices merely operate to indicate the position of the pointer relatively to the neutral position or whether they are instrumental in operating some mechanism for changing the conditions at the source of energy to which the indicating pointer is responsive.

For the sake of simplicity I have shown only three conductors. However it is apparent that the rod 13 may consist, within certain limits of any desired number of mutually insulated sections. It is also apparent that the rod 12 may likewise consist of a number of mutually insulated sections. In fact there is considerable latitude as to the arrangement whose purpose it is to energize separate or individual circuits depending upon the position of the pointer relatively to a point of reference.

While I have specifically shown an arrangement in which the pointer has angular movement, and while the invention is primarily intended to be applied to instruments having angularly movable pointers, I wish to emphasize nevertheless that the invention is applicable to arrangements in which the pointer or indicating hand has a different movement and that it has distinct utility in different types of indicating instruments.

In the construction so far described I have not shown any means for rotating the shafts 16 and 17. It is in fact not material whether these shafts are turned by hand or by mechanical devices. In some instances it may satisfy particular conditions if the shafts are turned by hand whenever it is desired. In other instances it may be desired to have the shafts periodically turned and in such cases mechanical means may be readily designed to accomplish the purpose.

In the foregoing an effort has been made to describe and explain the essential features of the invention and its principles of operation independently of any concrete application. To more fully indicate its scope of application and its significance in the art, reference is made to two types of indicating instruments in common use. It is to be understood, however, that these two instruments are referred to merely as conventional representations of a large class of instruments to which the invention may be readily applied. The instruments to be more particularly referred to are therefore not intended to have any special significance aside from the purpose just mentioned.

Fig. 6 represents a well known type of pressure or vacuum gauge which operates on the principle of the tendency of a curved tube to straighten out or contract when the pressure of a fluid in the tube is increased or decreased respectively, as for instance in the well known Bourdon tube. In the drawing the curved tube 20 is operatively connected with the pointer 21 through a lever 22, links 23 and 24 respectively and a rack 24ª. The rods 25 and 26 which for the sake of convenience are assumed to correspond to the arrangement in Figs. 7 and 8, are mounted upon supports 27 and 28. Support 27 is shown as pivotally carried on a pivot pin 27ª having screw threads to afford adjustable mounting in the casing of the meter and to facilitate removal of the mechanism.

Support 28 is connected to a shaft 29. The rods may be connected to electric circuits by means of conductors 30, 31 and 32 in the manner indicated in Fig. 7.

In Figs. 1 and 2 is shown a galvanometer of ordinary construction. The pointer 33 carries on its rear side an auxiliary finger 34 whose upper portion extends between the rods 35 and 36 corresponding to rods 12 and 13 in Figs. 7–10. Conductors 37, 38 and 39 may be connected to the rods in the manner previously described.

Whatever the acting force may be, causing the movement of the pointer, the position or positions of the pointer relatively to a point of reference may be indicated at a distant point or may be used as a criterion for changing conditions at the source of the energy giving directly or indirectly use to the indications or for otherwise producing effects as a function of the different positions of the pointer.

Figs. 2ª, 3, 4 and 5 show a mechanism which may be advantageously used to periodically turn the rods.

Upon a frame which is shown as consisting of plates 40 and 41 are mounted a wheel 42 having notches 43 and a projection 44, and a wheel 45 having notches 46. Between the wheels is pivotally mounted a detent 47 having teeth on opposite sides to co-operate with the notches 43 and 46 respectively. A spring blade 57 interconnects the wheels 42 and 45 and the plate 40 through pivot studs 48, 49 and 50. The blade is preferably secured upon one of the studs, for instance stud 48 as indicated, and passes loosely through openings in the other studs to afford sliding motion. The detent is pressed downwardly into contact with wheel 45 by means of a spring 56. Wheel 42 is mounted upon a shaft 51 which may be the shaft carrying the conductor rods previously mentioned or may be connected thereto. The wheel 45 is carried upon a shaft 52 adapted to be driven from the source of power by any suitable gearing as for instance bevel gears 53 and 54, shaft 55 representing the power shaft.

The operation is as follows:

The shaft 55 may be assumed to be driven by clockwork or any other source of power. The wheel 45 thus revolves at a uniform, preferably slow speed in the direction indicated by the arrow. During the greater part of the rotary motion of the wheel the detent 47 slides on the periphery and is thereby held upwardly against the tension of spring 56 in contact with wheel 42, the detent normally engaging a notch 43. When one of the notches 46 reaches the position immediately below the detent, as shown in Fig. 4, the detent will be forced downwardly into it thereby setting the wheel 42 free. In the positions indicated in Fig. 3 the stud 48 is at the left of a vertical plane passing through the shafts 51 and 52 while the stud 49 is at the right thereof. The stud 50 being disposed in this plane, the spring blade 57 is bent and tends to swing to the right. As soon as the wheel 42 is set free the spring action of blade 57 forces it to the right into the position shown in Fig. 4.

The bottom of the notch 46 is in substance a cam surface causing the detent to be lifted as the motion of wheel 45 continues and to engage the second notch 43. In order to limit the angular movement of wheel 42, adjustable stops 58 are provided to engage the projection 44. The stops and the notches 43 have the same angular spacing 20 so that in each limiting position a notch 43 is directly above the detent.

The stud 48 is now at the right of the aforementioned plane. As the movement of the wheel 45 continues, the stud 49 will gradually move to the left side of the plane and thus cause again a tensioning of the spring blade 57. When the wheel 45 reaches a position 180° displaced from that shown in Fig. 5, the second notch 46 comes directly under the detent and the wheel 42 is again set free and forced again to the left.

The operation thus effects a periodical oscillation of shaft 51. During one half of a revolution of the wheel 45 the conductor rods are in the position indicated in Fig. 9 and during the other half in the position indicated in Fig. 10. The peripheral speed of the wheel 45 is of course determined by the speed of the driving shaft and the gear ratio and may have any desired value. Mechanism may, of course, be readily provided for making the periods during which contact is made relatively short and the periods during which the pointer is set free relatively long. In fact mechanism within the scope of the invention for establishing definite periods of contact and release is more or less a matter of mechanical skill.

The arrangement just described is particularly advantageous for the purpose of making graphic records of the variations of positions of the pointer or for controlling by means of suitable translating devices the conditions indicated by the pointer.

In order to secure a good contact between the rod conductors and the pointer with a minimum of strain upon the pointer, the latter may be provided with a spring element 59. Fig. 11 or the pointer may, in general, consist of two resilient portions. Stop elements of the order of stops 58 may be so adjusted that in the limiting positions the rod conductors slightly impinge upon the resilient elements without exerting any material pressure upon the needle or pointer.

I claim:—

1. In an instrument of the class described, the combination with an indicating pointer, of conductors disposed on opposite sides of the pointer in planes substantially parallel with the plane of motion of the pointer, means for angularly moving the conductors about an axis in the said plane of motion and an electric circuit having its ends connected to the said conductors.

2. The combination with an indicating instrument including an indicating pointer moving about a pivot, of two conductors mounted on opposite sides of the pointer in planes parallel with the plane of motion of the pointer, and means for pivotally supporting the conductors about an axis in the said plane of motion.

3. In an instrument of the class described including a pivotally supported pointer, a rod consisting of a plurality of endwise connected but electrically separated conductors, a second rod of conducting material, means for pivotally supporting the two rods as a unit about an axis in the plane of motion of the pointer, the rods being located upon opposite sides of the pointer and electrically separated from one another, means for turning the rods about their axis and circuits connected to said conductors.

4. Device according to claim 2 including a uni-directionally operating motor and mechanism for translating the motion of the motor into oscillating motion of the conductors about their pivot.

5. The combination with an indicating instrument including an indicating pointer moving about a pivot, of conductors mounted on opposite sides of the pointer in planes parallel with the plane of motion of the pointer, means for pivotally supporting the conductors about an axis in the said plane of motion and means operative to move the conductors into and out of contact with the pointer by a snap action.

6. Device according to claim 5 including a uni-directionally operating motor for actuating said operating means.

In testimony whereof I affix my signature.

JOHN C. HALE.